(12) United States Patent
Kumar et al.

(10) Patent No.: US 12,437,018 B2
(45) Date of Patent: Oct. 7, 2025

(54) WEB BROWSER PLUGIN REDIRECTING TO A WEBSITE FOR A VEHICLE DATABASE

(71) Applicant: Capital One Services, LLC, McLean, VA (US)

(72) Inventors: Lokesh Vijay Kumar, Frisco, TX (US); Poornima Bagare Raju, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/358,687

(22) Filed: Jul. 25, 2023

(65) Prior Publication Data
US 2025/0036701 A1    Jan. 30, 2025

(51) Int. Cl.
| | |
|---|---|
| *G06F 7/00* | (2006.01) |
| *G06F 9/445* | (2018.01) |
| *G06F 9/54* | (2006.01) |
| *G06F 16/9538* | (2019.01) |
| *G06F 16/954* | (2019.01) |
| *G06F 16/958* | (2019.01) |

(52) U.S. Cl.
CPC ........ *G06F 16/954* (2019.01); *G06F 9/44526* (2013.01); *G06F 9/547* (2013.01); *G06F 16/9538* (2019.01); *G06F 16/958* (2019.01)

(58) Field of Classification Search
CPC .. G06F 16/954; G06F 16/9538; G06F 16/958; G06F 9/44526; G06F 9/547
See application file for complete search history.

(56) References Cited

U.S. PATENT DOCUMENTS

| | | | |
|---|---|---|---|
| 9,691,095 B2* | 6/2017 | McCluskey | G06Q 30/08 |
| 10,467,703 B2* | 11/2019 | Olson | G06Q 40/08 |
| 10,699,323 B1* | 6/2020 | Tang | G06T 19/006 |
| 10,846,802 B1 | 11/2020 | Olson | |
| 2002/0107747 A1* | 8/2002 | Gerogianni | G06Q 30/06 705/26.8 |
| 2004/0267610 A1* | 12/2004 | Gossett | G06Q 30/0214 705/14.16 |
| 2010/0274775 A1* | 10/2010 | Fontes | G06F 16/9038 707/706 |
| 2012/0173692 A1* | 7/2012 | Lakes | G06F 16/9558 709/223 |
| 2013/0238612 A1* | 9/2013 | Tsongas | G06F 16/9535 707/723 |
| 2014/0143095 A1* | 5/2014 | McCluskey | G06Q 30/0627 705/26.63 |
| 2014/0279275 A1* | 9/2014 | Burgiss | G06Q 30/0635 705/26.81 |
| 2016/0307174 A1* | 10/2016 | Marcelle | G06Q 30/0621 |

(Continued)

*Primary Examiner* — Mohammed R Uddin
(74) *Attorney, Agent, or Firm* — Harrity & Harrity, LLP (57) ABSTRACT

In some implementations, a browser plugin may receive, from a web browser executed by a user device, an indication of a vehicle make and a vehicle model. The browser plugin may transmit, to an API function associated with the vehicle database, a query indicating the vehicle make and the vehicle model. The browser plugin may receive, from the vehicle database, a response indicating at least a quantity of matching vehicles. The browser plugin may output instructions for a pop-up window in the web browser that indicates the quantity of matching vehicles and that includes an element linking to the website associated with the vehicle database.

20 Claims, 10 Drawing Sheets

(56) References Cited

U.S. PATENT DOCUMENTS

| | | |
|---|---|---|
| 2017/0255983 A1* | 9/2017 | McCluskey .......... G06Q 30/06 |
| 2018/0349988 A1* | 12/2018 | Shebesta ............. G06Q 40/02 |
| 2021/0120297 A1* | 4/2021 | Deshpande .......... G07C 5/008 |
| 2022/0172273 A1 | 6/2022 | Price et al. |
| 2022/0309546 A1* | 9/2022 | Zheng ............. G06Q 30/0255 |

* cited by examiner

WEB BROWSER PLUGIN REDIRECTING TO A WEBSITE FOR A VEHICLE DATABASE

BACKGROUND

Browsing for vehicles online may include performing searches. For example, a user may perform a search on a database associated with a vehicle dealer.

SUMMARY

Some implementations described herein relate to a system for redirecting to a website associated with a vehicle database. The system may include one or more memories and one or more processors communicatively coupled to the one or more memories. The one or more processors may be configured to receive, using a plugin to a web browser executed by a user device, an indication of a vehicle make and a vehicle model. The one or more processors may be configured to transmit, to an application programming interface (API) function associated with the vehicle database, a query indicating the vehicle make and the vehicle model. The one or more processors may be configured to receive, from the vehicle database, a response indicating at least a quantity of matching vehicles. The one or more processors may be configured to output instructions for a pop-up window in the web browser that indicates the quantity of matching vehicles and that includes an element linking to the website associated with the vehicle database.

Some implementations described herein relate to a method of redirecting to a website associated with a vehicle database. The method may include receiving, using a plugin to a web browser executed by a user device, an indication of a vehicle make and a vehicle model. The method may include transmitting, to an API function associated with the vehicle database, a query indicating the vehicle make and the vehicle model. The method may include receiving, from the vehicle database, a response indicating at least a quantity of matching vehicles. The method may include outputting an indication of the quantity of matching vehicles. The method may include receiving input from a user of the user device. The method may include outputting instructions, in response to the input from the user, for the web browser to navigate to the website associated with the vehicle database.

Some implementations described herein relate to a non-transitory computer-readable medium that stores a set of instructions for redirecting to a website associated with a vehicle database. The set of instructions, when executed by one or more processors of a device, may cause the device to initiate a plugin based on execution of a web browser, associated with the plugin, by a user device. The set of instructions, when executed by one or more processors of the device, may cause the device to determine, using the plugin, that the web browser has loaded a webpage unaffiliated with the vehicle database. The set of instructions, when executed by one or more processors of the device, may cause the device to extract, using the plugin, an indication of a vehicle make and a vehicle model based on user input into the webpage. The set of instructions, when executed by one or more processors of the device, may cause the device to transmit, to an API function associated with the vehicle database, a query indicating the vehicle make and the vehicle model. The set of instructions, when executed by one or more processors of the device, may cause the device to receive, from the vehicle database, a response indicating at least a quantity of matching vehicles. The set of instructions, when executed by one or more processors of the device, may cause the device to output an indication of the quantity of matching vehicles.

DETAILED DESCRIPTION

The following detailed description of example implementations refers to the accompanying drawings. The same reference numbers in different drawings may identify the same or similar elements.

A user of a user device may search for vehicles on the Internet. For example, the user may navigate to a webpage that serves as a front-end for a database associated with a vehicle dealer and execute a query on the database. In order to compare across multiple databases, the user repeats a same search across multiple front-ends for the databases. Repeated searches consume power and processing resources at the user device and consume network resources for every search.

An aggregator may allow for reducing a quantity of searches by collating vehicle information from multiple dealers. However, some dealers may refuse to allow access to the aggregator. As a result, the user still repeats a same search across a front-end for the aggregator and front-ends for non-participating dealers.

Some implementations described herein enable a browser plugin to automatically extract vehicle information from a webpage and perform an application programming interface (API) call to an aggregator. For example, the browser plugin may detect that a user is performing a search on a webpage associated with a non-participating dealer and may automatically perform the search on the aggregator. As a result, the browser plugin conserves power and processing resources that otherwise would have been expended on navigating to a front-end associated with the aggregator and performing the search. Additionally, the API call generally uses fewer network resources as compared with navigating to the front-end associated with the aggregator and performing the search.

FIGS. 1A-1E are diagrams of an example 100 associated with using a web browser plugin to redirect to a website for a vehicle database. As shown in FIGS. 1A-1E, example 100 includes a user device executing a web browser and a plugin and communicating with a website host and a vehicle database. These devices are described in more detail in connection with FIGS. 4 and 5.

Figure 1A:
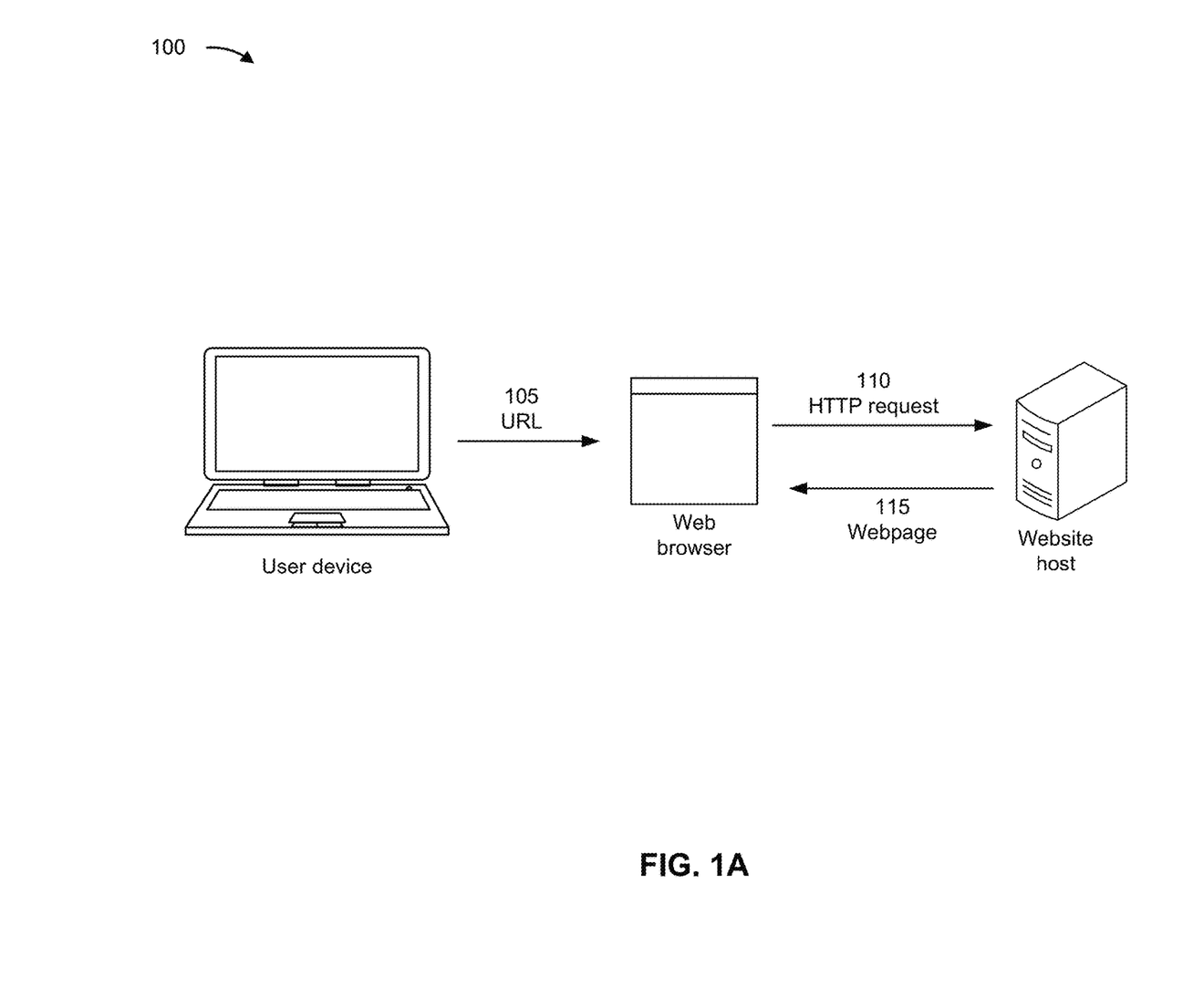
FIGS. 1A-1E are diagrams of an example implementation relating to using a web browser plugin to redirect to a website for a vehicle database, in accordance with some embodiments of the present disclosure.

In example 100, a user of the user device may execute a web browser. For example, the user may provide input (e.g., via an input component, such as a keyboard, a mouse, or a microphone) that triggers an operating system (OS) of the user device to start an instance of the web browser. The web browser may include Microsoft Edge®, Mozilla Firefox®, Google Chrome®, Safari®, or another type of application configured to retrieve webpages based on user input.

Additionally, a plugin may initiate based on execution of the web browser. For example, the plugin may be associated with a setting that triggers the web browser to automatically initiate the plugin when the web browser is starting up. Alternatively, the plugin may be associated with a setting that disables the plugin. Accordingly, the user may provide input (e.g., via an input component, such as a keyboard, a mouse, or a microphone) that triggers the web browser to initiate the plugin. The input may include confirmation provided in response to a dialog box (or another type of user interface (UI)) or an icon (e.g., in a toolbar of the web browser) associated with the plugin, among other examples.

As shown in FIG. 1A and by reference number 105, the user device (e.g., via the OS) may provide a uniform resource locator (URL) to the web browser. For example, the user may provide input (e.g., via an input component, such as a keyboard, a mouse, or a microphone) that indicates the URL. The URL may be associated with a webpage that is unaffiliated with the vehicle database. For example, the URL may be associated with a webpage that functions as a front-end for a database associated with a dealer not participating in the vehicle database (also referred to as a "non-participating dealer").

As shown by reference number 110, the web browser may transmit (e.g., using a modem of the user device), and the website host may receive, a hypertext transfer protocol (HTTP) request. The website host is associated with the URL. For example, the web browser may resolve the URL (e.g., using a domain name service (DNS) or another type of service) such that the HTTP request is addressed to an Internet protocol (IP) address associated with the URL.

Figure 1B:
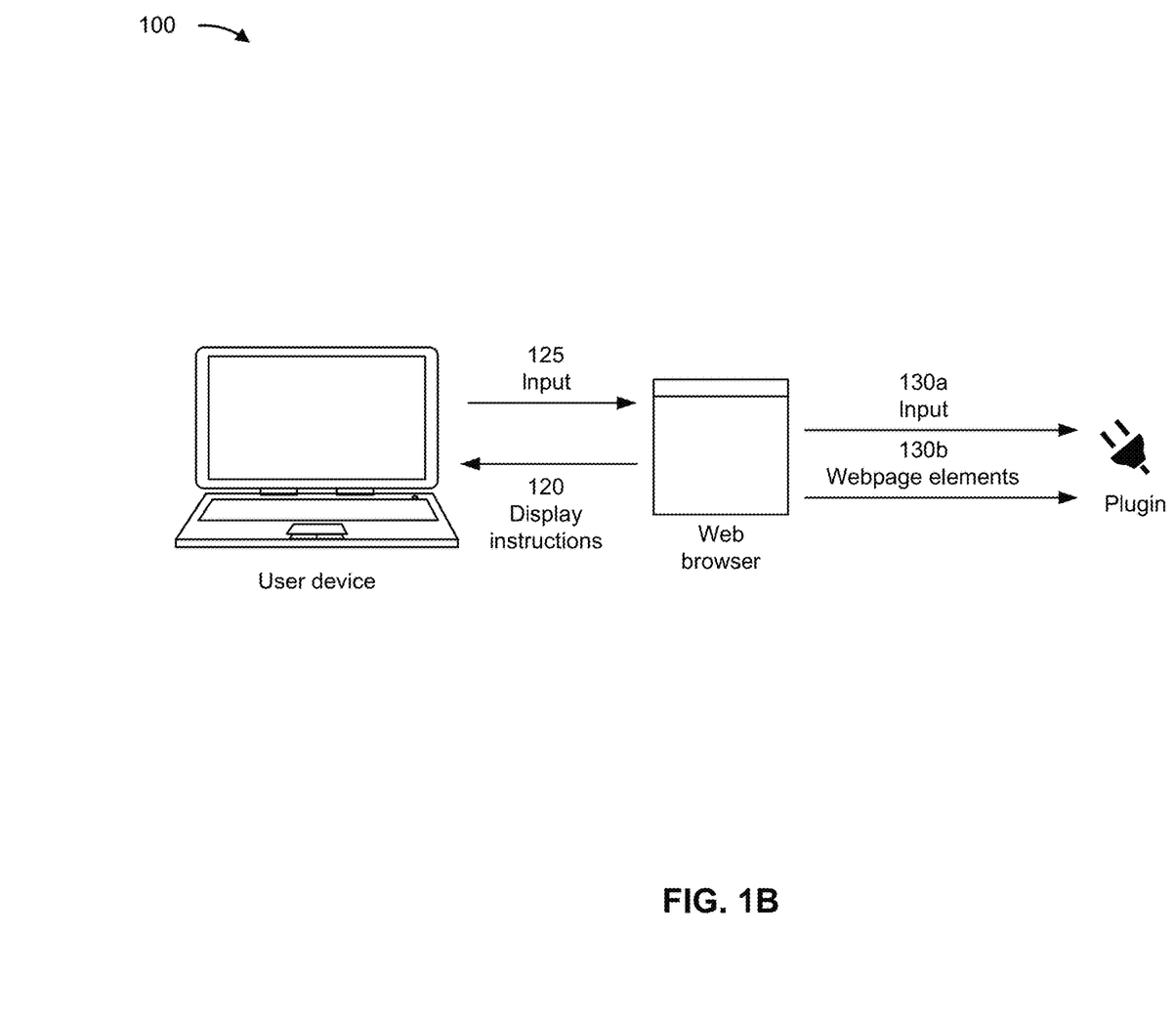

As shown by reference number 115, the website host may transmit, and the web browser may receive (e.g., using the modem of the user device), the webpage associated with the URL. The webpage may include a hypertext markup language (HTML) file, a JavaScript® file, a cascading style sheets (CSS) file, and/or a multimedia file (e.g., an image file and/or a video file), among other examples. Accordingly, as shown in FIG. 1B and by reference number 120, the web browser may provide display instructions to the user device based on the webpage. For example, the web browser may render the webpage and output the rendered webpage to the user via an output component (e.g., a screen and/or a speaker, among other examples) of the user device.

As shown by reference number 125, the user device (e.g., via the OS) may provide input to the web browser. For example, the user may provide the input via an input component (e.g., a keyboard, a mouse, or a microphone, among other examples). The input may include parameters for a vehicle search. For example, the input may include a vehicle make, model, year, and/or trim. Other parameters may include color, powertrain, interior fabric, wheel material, driver assist systems, safety systems, steering features, and/or infotainment features, among other examples. In some implementations, the user may provide the input as text (e.g., providing year, make, model, and/or trim as input to a text box). Additionally, or alternatively, the user may provide the input using UI elements of the webpage (e.g., by selecting radio buttons, selecting checkboxes, selecting from a drop-down menu, or selecting search filters, among other examples).

As shown by reference number 130*a*, the plugin may determine an indication of vehicle information (e.g., a vehicle make, a vehicle model, a vehicle year, and/or a vehicle trim, among other examples described herein) based on the input. For example, the plugin may monitor an input component (e.g., at least one input component) of the user device to determine text input into a text box, a selection from a drop-down menu or a set of radio buttons, and/or a selection from a plurality of filters. Additionally, or alternatively, as shown by reference number 130*b*, the plugin may monitor elements of the webpage to determine the indication of vehicle information. For example, the plugin may monitor a text box, a checkbox, a set of radio buttons, a drop-down menu, and/or a search filter to determine when the user provides input (e.g., based on changes in style of the elements). As a result, the plugin receives the indication of the vehicle information (e.g., a vehicle make, a vehicle model, a vehicle year, and/or a vehicle trim, among other examples described herein) based on the input.

In order to conserve power and processing resources, the plugin may refrain from monitoring user input and/or webpage elements continuously. Instead, the plugin may determine that the web browser has navigated to a webpage that satisfies a criterion (e.g., one or more criteria). The criterion may include the webpage being associated with a vehicle dealer and/or being unaffiliated with the vehicle database. For example, the plugin may compare the URL used by the web browser with a list of a URLs to determine that the web browser has loaded a webpage unaffiliated with the vehicle database. Additionally, or alternatively, the plugin may use indicia on the webpage to determine that the webpage is associated with a vehicle dealer and is unaffiliated with the vehicle database. The indicia may include a title of the webpage, a header of the webpage, a presence of UI elements associated with a vehicle search (e.g., input elements labeled "year," "make," "model," or "trim," among other examples). Therefore, the plugin may receive the indication of the vehicle information (and/or transmit a query to an API function, as described in connection with FIG. 1C) based on the webpage satisfying the criterion.

Figure 1C:
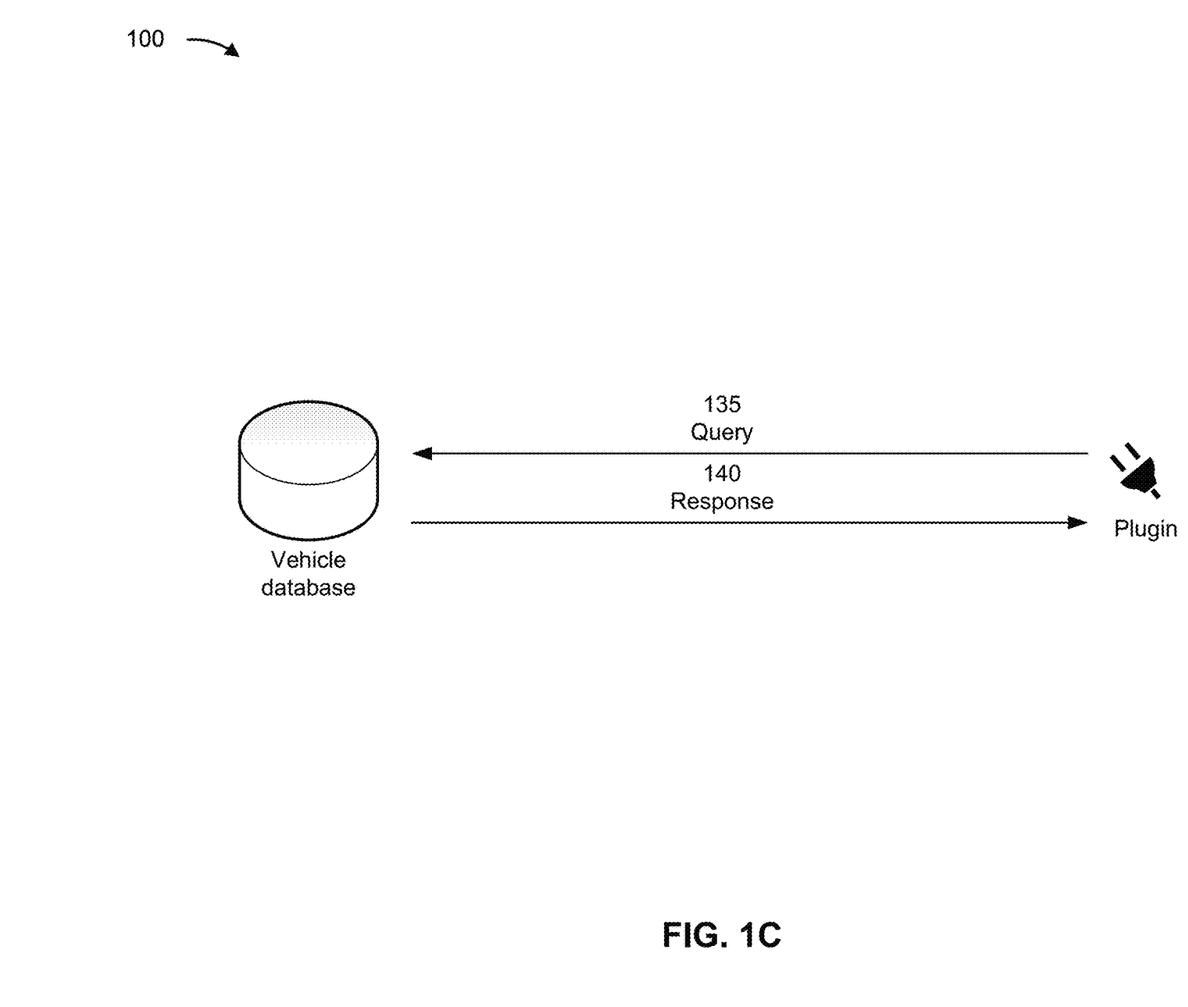

As shown in FIG. 1C and by reference number 135, the plugin may transmit, to an API function associated with the vehicle database, a query indicating the vehicle information. For example, the query may indicate a vehicle make, a vehicle model, a vehicle year, and/or a vehicle trim, among other examples described herein. The API function may be associated with an aggregator for a plurality of vehicle dealers (e.g., excluding a vehicle dealer associated with the webpage loaded by the web browser). Accordingly, the vehicle database may be an aggregated database of vehicles across multiple vehicle dealers. The plugin may call the API function in the background (e.g., while the user is viewing the webpage). The plugin may refrain from notifying the user about the call or may notify the user subtly (e.g., using a moving icon in a toolbar of the web browser and/or another type of indicator that does not obstruct viewing of the webpage). As a result, the plugin may execute the query on the vehicle database using less network overhead and less power and processing resources at the user device, as compared with the web browser navigating to a website associated with the vehicle database, loading the website, and rendering the website such that the user may perform a search on the vehicle database.

In some implementations, the plugin may additionally detect a location associated with the user device. For example, the plugin may use an IP address associated with the user device to estimate the location of the user device. Additionally, or alternatively, the user may input the location (e.g., a zip code) into the webpage such that the plugin may extract the location based on monitoring user input and/or monitoring elements of the webpage, as described above. Accordingly, the query may further indicate the location associated with the user device.

In some implementations, the plugin may be associated with a folder (or another type of cache) on the user device. Accordingly, the plugin may receive an endpoint (e.g., an IP address) associated with the API function from the cache.

As shown by reference number 140, the vehicle database may transmit, and the plugin may receive, a response indicating at least a quantity of matching vehicles. As used herein, "matching vehicles" refers to vehicles that satisfy all parameters in the query (that is, perfect matches) or that satisfy a portion of the parameters in the query (that is, fuzzy matches). Additionally, "matching vehicles" may include vehicles that are within a margin of error of parameters in the query (e.g., a 1997 vehicle when the query indicated 1998). Thus, "matching vehicles" may include vehicles that are (when vectorized) within a distance of the query that satisfies a distance threshold. The response may include an HTTP response and/or a return from the API function.

Figure 1D:
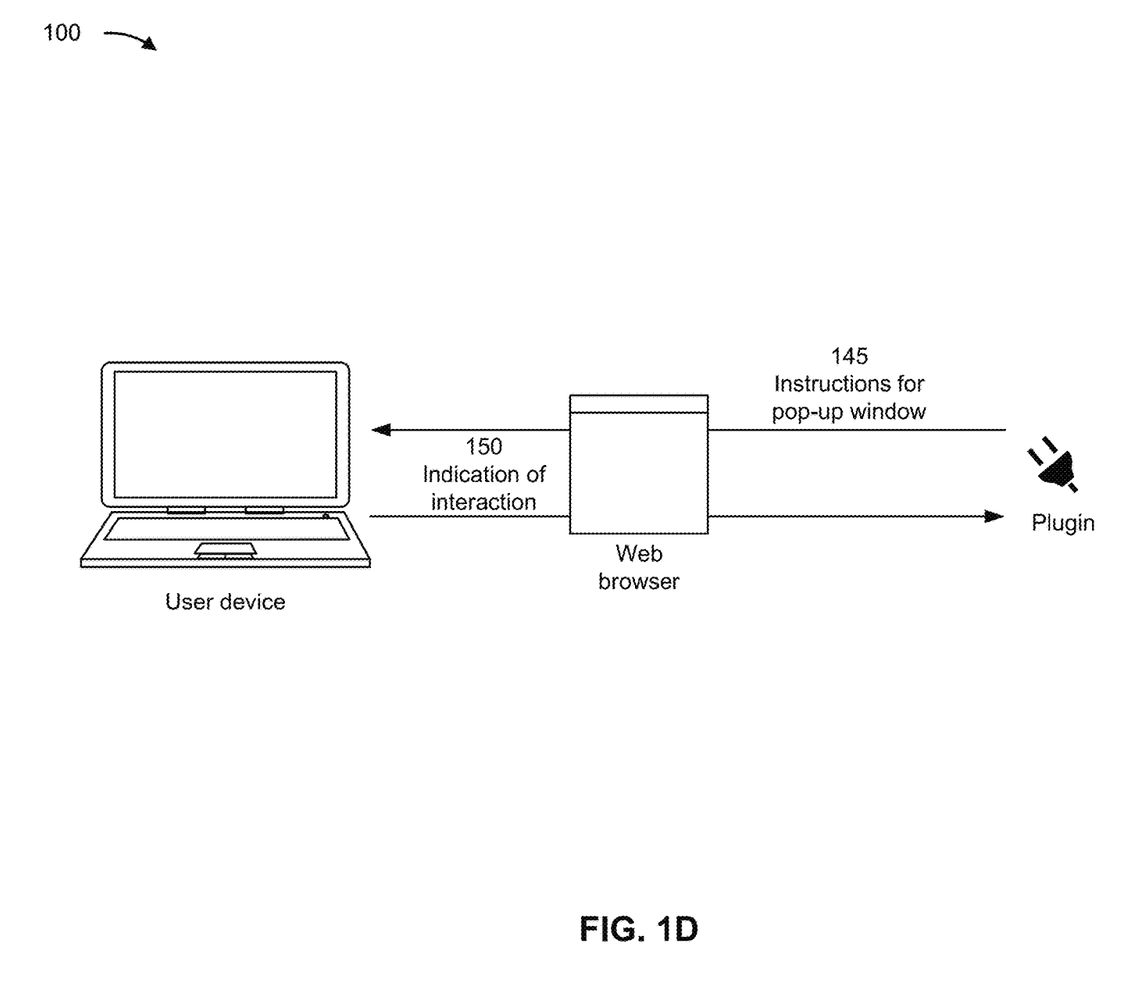

The plugin may output an indication of the quantity of matching vehicles. For example, as shown in FIG. 1D and by reference number 145, the plugin may output (via the web browser and the user device) instructions for a pop-up window in the web browser that indicates the quantity of matching vehicles. The pop-up window may be as described in connection with FIG. 2 and/or FIG. 3. For example, the pop-up window may include text (or another type of element) that indicates the quantity of matching vehicles. In some implementations, the pop-up window may further include an element linking to a website associated with the vehicle database. For example, as described in connection with FIG. 2, the pop-up window may include a button that links to the website.

In some implementations, the response may further indicate an amount (e.g., at least one amount). For example, the response may indicate a price (e.g., at least one price) associated with a matching vehicle (e.g., at least one of the matching vehicles). Accordingly, as described in connection with FIG. 2, the pop-up window may include text (or another type of element) that indicates the amount. In some implementations, the plugin may select from a plurality of amounts included in the response (e.g., selecting a smallest amount, as described in connection with FIG. 2) such that the pop-up window indicates the selected amount. Additionally, or alternatively, the plugin may derive an amount (e.g., from a plurality of amounts included in the response) such that the pop-up window indicates the derived amount. The derived amount may include a median and/or average, among other examples.

Additionally, or alternatively, the plugin may extract a comparison amount. For example, the comparison amount may include a price associated with the webpage (and thus with the non-participating vehicle dealer). The plugin may determine the comparison amount from an element of the webpage. For example, the plugin may monitor a body of the webpage (e.g., associated with results from a search performed on the webpage) to determine the comparison amount. Accordingly, as described in connection with FIG. 2, the pop-up window may include text (or another type of element) that indicates the comparison amount. For example, the pop-up window may include an indication of the comparison amount along with (e.g., adjacent to) the indication of the amount.

Additionally, or alternatively, the plugin may transmit, to an API function associated with an affiliate of the vehicle database, a request for a monthly amount. The API function may be associated with a financial institution associated with the vehicle database (e.g., via a contractual agreement and/or via shared hardware on a server or server farm). Similarly to the API function associated with the vehicle database, the plugin may call the API function associated with the affiliate in the background (e.g., while the user is viewing the webpage). The plugin may refrain from notifying the user about the call or may notify the user subtly, as described above. As a result, the plugin may transmit the request using less network overhead and less power and processing resources at the user device as compared with the web browser navigating to a webpage associated with the affiliate, loading the webpage, and rendering the webpage such that the user may request the monthly amount.

The plugin may receive, from the affiliate, a response indicating the monthly amount. For example, the response may include an HTTP response and/or a return from the API function. Accordingly, as described in connection with FIG. 3, the pop-up window may include text (or another type of element) that indicates the monthly amount. Additionally, or alternatively, the plugin may determine a comparison monthly amount. For example, the comparison monthly amount may be associated with a different affiliate or may be a national average. The plugin may transmit a request for the comparison monthly amount to the different affiliate and receive a response indicating the comparison monthly amount. Additionally, or alternatively, the plugin may calculate the comparison monthly amount according to a stored formula (or receive an indication of the comparison monthly amount from the affiliate, where the affiliate calculated the comparison monthly amount according to the stored formula). Accordingly, as described in connection with FIG. 3, the pop-up window may include text (or another type of element) that indicates the comparison monthly amount. For example, the pop-up window may include an indication of the comparison monthly amount along with (e.g., adjacent to) the indication of the monthly amount.

As shown by reference number 150, the plugin may receive (via the user device and the web browser) an indication of interaction with the element that links to the website associated with the vehicle database. For example, the user may click, tap, double-click, double-tap, press an "Enter" key, or speak a voice command, among other examples, that constitutes interaction with the element.

Figure 1E:
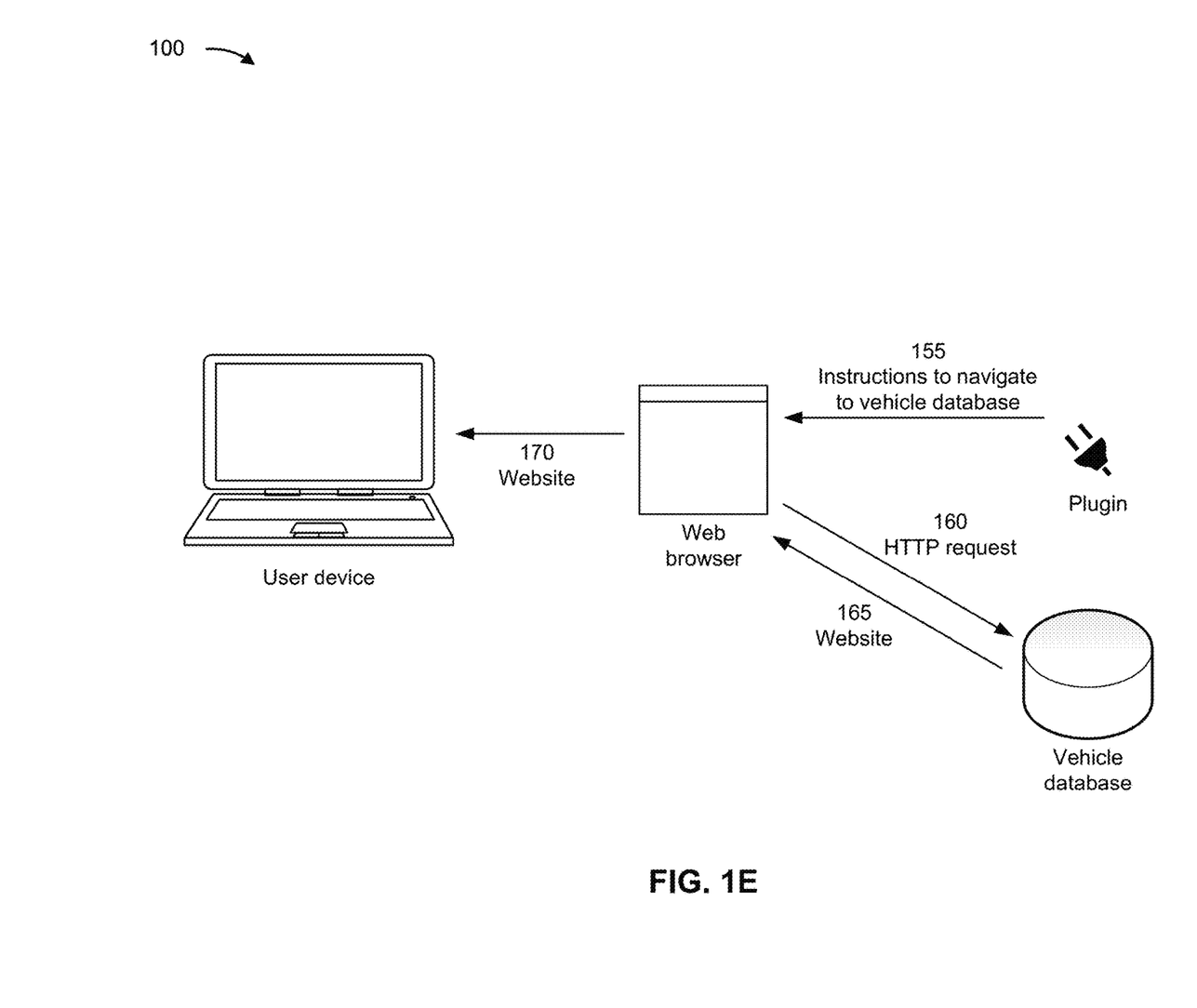

As shown in FIG. 1E and by reference number 155, the plugin may output instructions, in response to the indication of the interaction, for the web browser to navigate to the website associated with the vehicle database. Therefore, based on input from the user, the plugin may redirect the web browser to the website. The plugin may trigger the web browser to load the website over the webpage associated with the vehicle dealer. Alternatively, the plugin may trigger the web browser to open the website in a new tab. In some implementations, a setting (e.g., stored in the cache associated with the plugin) may determine whether the web browser loads the website over the webpage or opens the website in a new tab.

As shown by reference number 160, the web browser may transmit (e.g., using the modem of the user device), and the vehicle database may receive, an HTTP request. The web browser may transmit the HTTP request in response to the instructions from the plugin. For example, the instructions may indicate a URL associated with the vehicle database, and the web browser may resolve the URL (e.g., using a DNS or another type of service) such that the HTTP request is addressed to an IP address associated with the URL. Additionally, or alternatively, the instructions may indicate the IP address associated with the vehicle database. In some implementations, the instructions may indicate a deep link for the vehicle database. For example, the instructions may indicate (e.g., in the URL and/or in fields associated with the IP address) parameters such that the website opens to results of the query on the vehicle database rather than on a homescreen (or another landing page) associated with the vehicle database.

As shown by reference number 165, the vehicle database may transmit, and the web browser may receive (e.g., using the modem of the user device), the website associated with the vehicle database. The website may include an HTML file, a JavaScript file, a CSS file, and/or a multimedia file (e.g., an image file and/or a video file), among other examples. Accordingly, as shown by reference number 170, the web browser may provide display instructions to the user device based on the website. For example, the web browser may render the website and output the rendered website to the user via an output component (e.g., a screen and/or a speaker, among other examples) of the user device.

By using techniques as described in connection with FIGS. 1A-1E, the plugin automatically extracts vehicle information from a webpage and transmits the vehicle information to an API function associated with the vehicle database. For example, the plugin may extract the vehicle information based on determining that the webpage is unaffiliated with the vehicle database. As a result, the plugin conserves power and processing resources that otherwise would have been expended on navigating to the website associated with the vehicle database and repeating a search that was performed using the webpage. Additionally, transmitting to the API function generally uses fewer network resources as compared with navigating to the website associated with the vehicle database and repeating the search.

As indicated above, FIGS. 1A-1E are provided as an example. Other examples may differ from what is described with regard to FIGS. 1A-1E.

Figure 2:
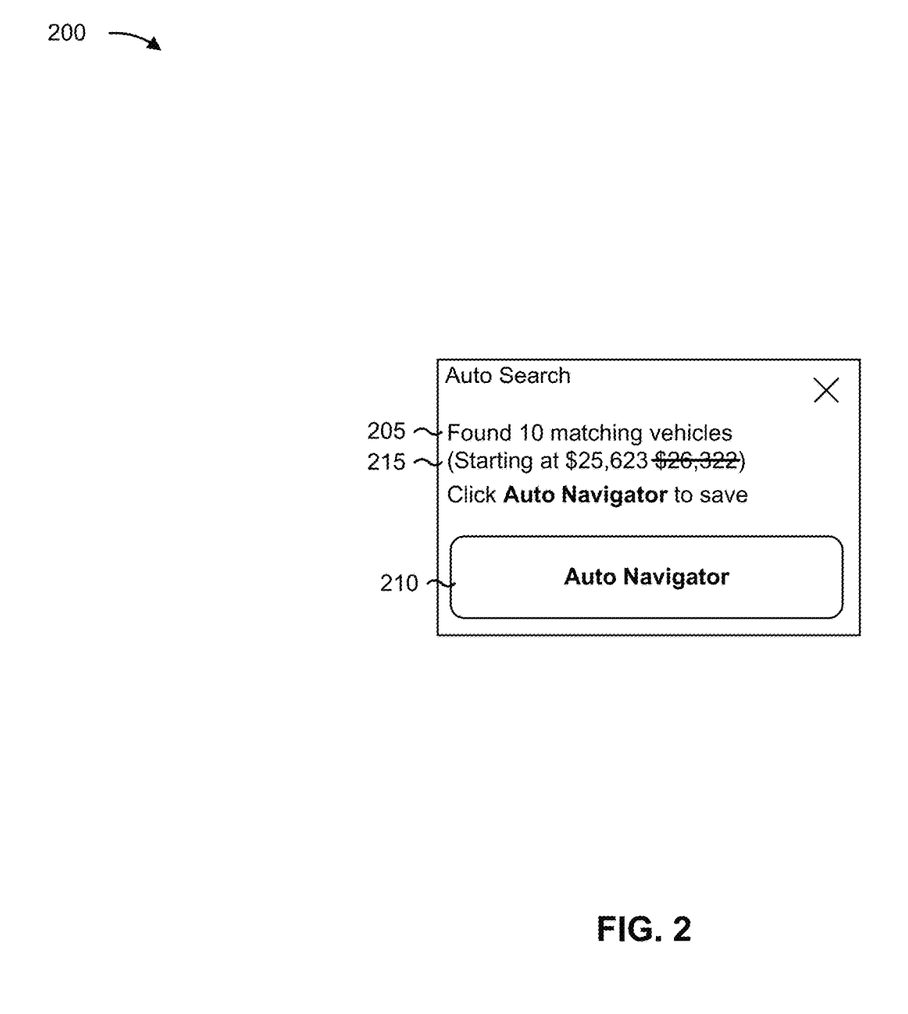
FIG. 2 is a diagram of an example user interface (UI) associated with a web browser plugin described herein, in accordance with some embodiments of the present disclosure.

FIG. 2 is a diagram of an example UI 200 associated with a web browser plugin described herein. The example UI 200 shown in FIG. 2 may be output by a user device based on instructions from the web browser plugin. These devices are described in more detail in connection with FIGS. 4 and 5.

As shown in FIG. 2, the example UI 200 may include text 205 that indicates a quantity of matching vehicles (which is "10" in FIG. 2). The example UI 200 may further include a button 210 that links to a website associated with a vehicle database. For example, as described in connection with FIGS. 1D-1E, interaction with the button 210 may trigger a web browser (associated with the web browser plugin) to navigate to the website. As further shown in FIG. 2, the example UI 200 may include text 215 that indicates an amount associated with the matching vehicles. In FIG. 2, the amount is a lowest amount (represented by "starting at") out of the amounts associated with the matching vehicles. Other examples may indicate multiple amounts, a range of amounts, an average, and/or a median. In FIG. 2, the text 215 further indicates a comparison amount. The comparison amount may be associated with a webpage currently being viewed rather than being associated with the vehicle database.

As indicated above, FIG. 2 is provided as an example. Other examples may differ from what is described with regard to FIG. 2.

Figure 3:
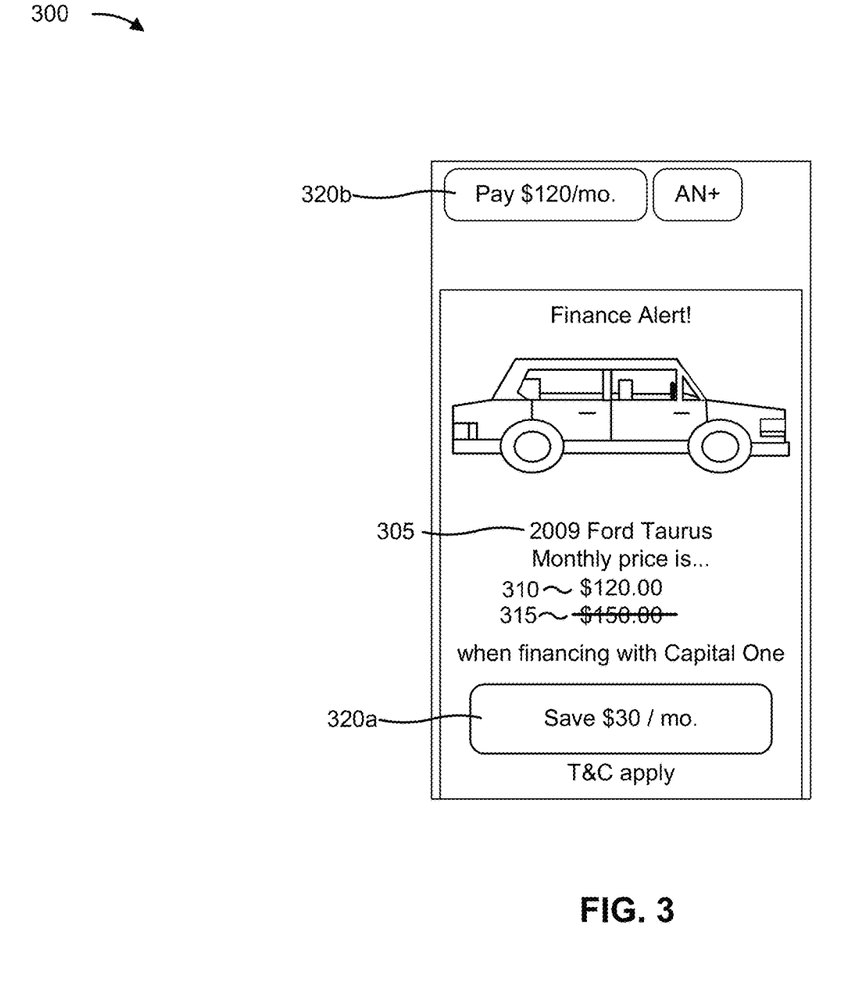
FIG. 3 is a diagram of an example UI associated with a web browser plugin described herein, in accordance with some embodiments of the present disclosure.

FIG. 3 is a diagram of an example UI 300 associated with a web browser plugin described herein. The example UI 300 shown in FIG. 3 may be output by a user device based on instructions from the web browser plugin. These devices are described in more detail in connection with FIGS. 4 and 5.

As shown in FIG. 3, the example UI 300 may include text 305 that indicates vehicle information (which is a vehicle year of "2009," a vehicle make of "Ford," and a vehicle model of "Taurus" in FIG. 3). As further shown in FIG. 3, the example UI 300 may include text 310 that indicates a monthly amount associated with the matching vehicles. In FIG. 3, the amount is a selected monthly amount associated with one of the matching vehicles. Other examples may indicate multiple monthly amounts, a range of monthly amounts, an average, and/or a median. In FIG. 3, the example UI 300 may further include text 315 that indicates a comparison monthly amount. The comparison monthly amount may be associated with a different affiliate and/or a national average.

As shown in FIG. 3, the example UI 300 may include a button 320*a* and a button 320*b* that each link to a website associated with a vehicle database. For example, as described in connection with FIGS. 1D-1E, interaction with the button 320*a* or the button 320*b* may trigger a web browser (associated with the web browser plugin) to navigate to the website.

As indicated above, FIG. 3 is provided as an example. Other examples may differ from what is described with regard to FIG. 3.

Figure 4:
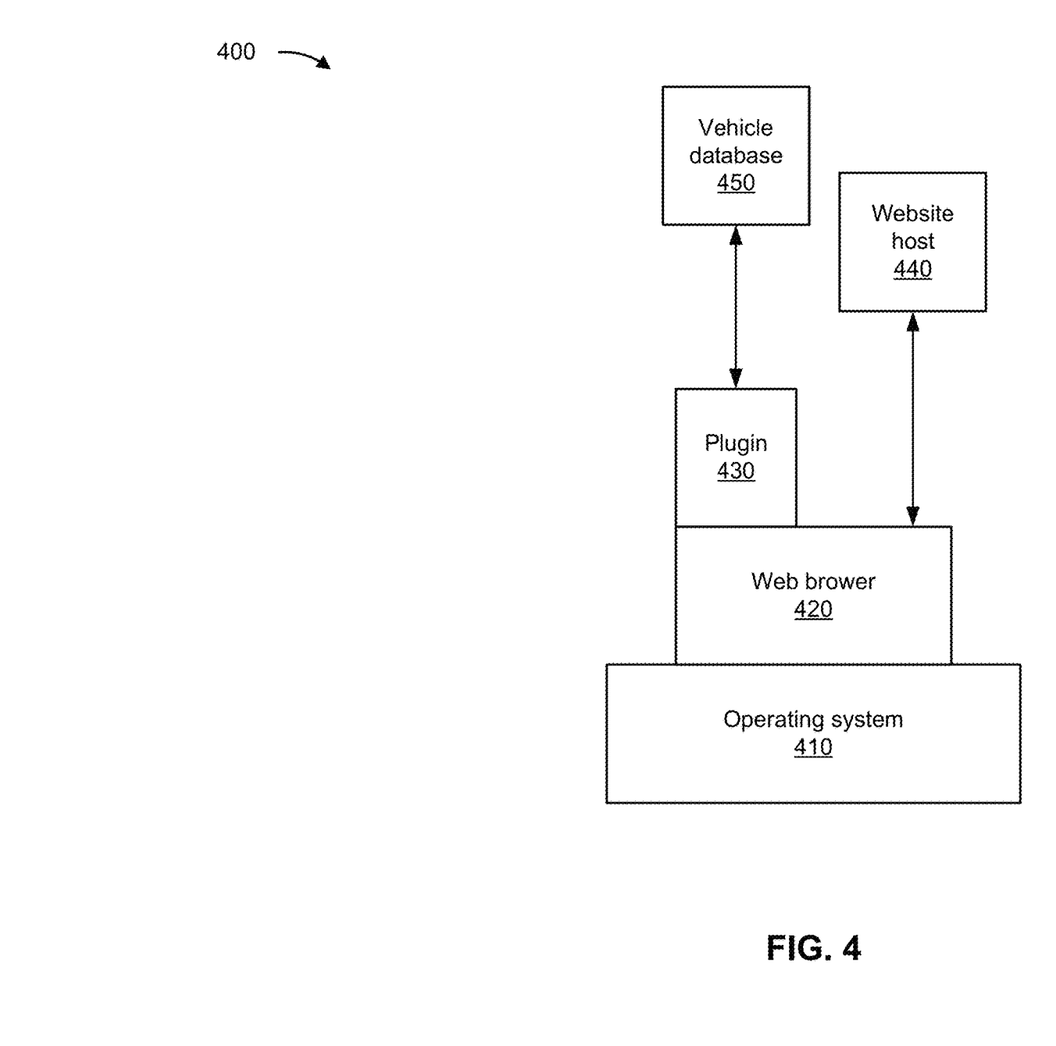
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include an operating system 410, a web browser 420 (e.g., supported by the operating system 410), and a plugin 430 (e.g., executed as a sub-routine within the web browser 420 or otherwise integrated with execution of the web browser 420), as described in more detail below. The operating system 410, the web browser 420, and the plugin 430 may be executed on a user device. The user device may include a communication device. For example, the user device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device may include an output component (e.g., a speaker device to transmit audio to a user and/or a screen to display images to the user). The user device may further include an input device to facilitate interaction with a user. Example input devices include a microphone, a keyboard, a touchscreen, and/or a mouse. Additionally, as further shown in FIG. 4, environment 400 may include a website host 440 and a vehicle database 450. Devices and/or elements of environment 400 may interconnect via wired connections and/or wireless connections.

Figure 5:
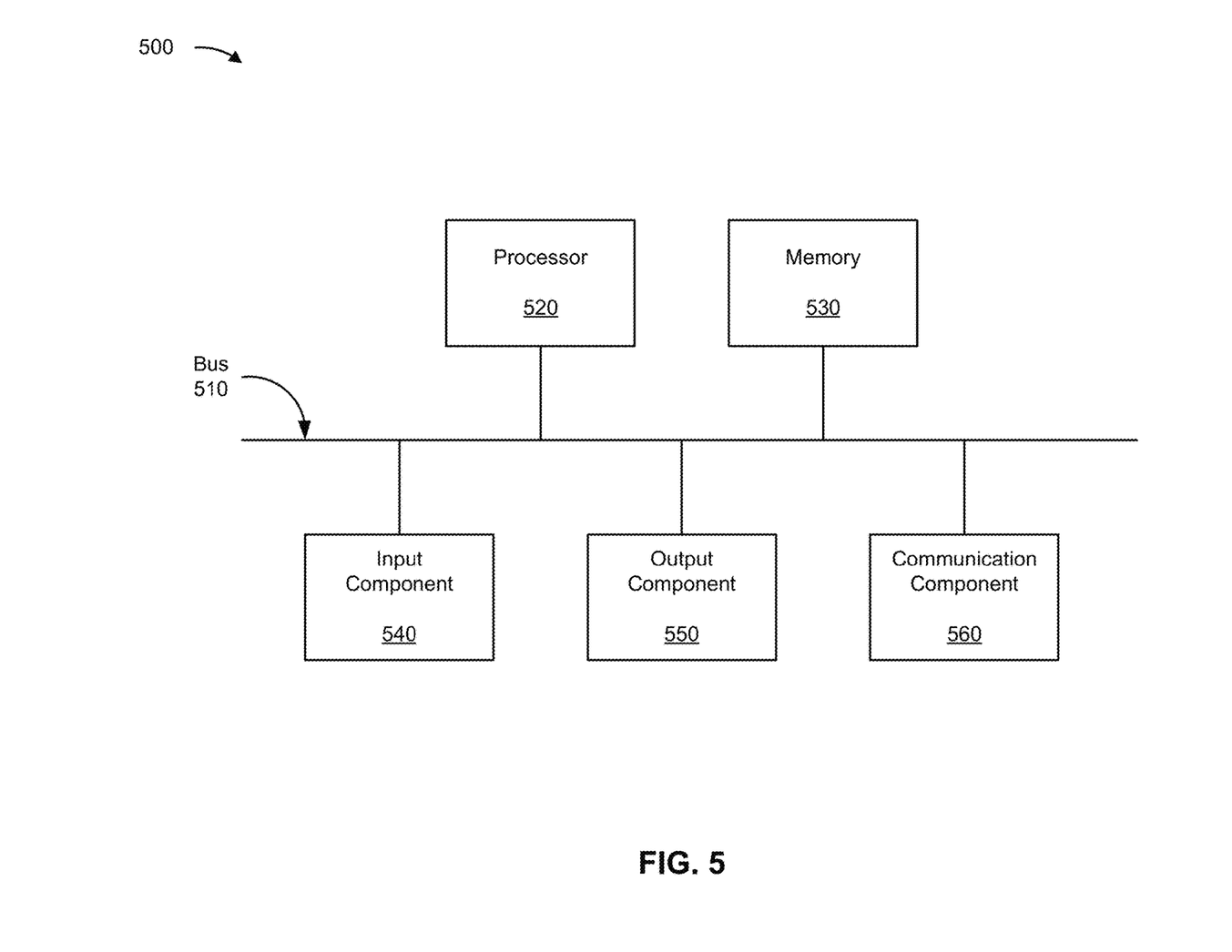
FIG. 5 is a diagram of example components of one or more devices of FIG. 4, in accordance with some embodiments of the present disclosure.

The operating system 410 may include system software capable of managing hardware of the user device (which may include, for example, one or more components of device 500 of FIG. 5) and providing an environment for execution of higher-level software, such as the web browser 420. For example, the operating system 410 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 410 may additionally provide a UI and process input from a user.

The web browser 420 may include an executable capable of running on a user device using the operating system 410. In some implementations, the web browser 420 may communicate with the website host 440 and/or the vehicle database 450. For example, the web browser 420 may use an HTTP, a file transfer protocol (FTP), and/or another Internet- or network-based protocol to request information from, transmit information to, and receive information from, the website host 440 and/or the vehicle database 450. Additionally, the web browser 420 may support, or at least control, the plugin 430, as described elsewhere herein. Accordingly, the plugin 430 may include an extension or another type of software that executes on top of the web browser 420.

The plugin 430 may include a built-in executable portion of the web browser 420. The plugin 430 may detect vehicle information in webpages and query the vehicle database 450 based on the vehicle information. The plugin 430 may further generate instructions for UIs, as described herein, that are displayed within, or on top of, a UI of the web browser 420.

The website host 440 may include a remote computing device that provides information to requesting devices over the Internet and/or another network (e.g., a cellular network, a public land mobile network (PLMN), a local area network (LAN), a wide area network (WAN), a private network, the Internet, and/or a combination of these or other types of networks). The website host 440 may include a standalone server, one or more servers included on a server farm, or one or more servers spread across a plurality of server farms. In some implementations, the website host 440 may include a cloud computing system. As an alternative, the website host 440 may include one or more devices, such as device 500 of FIG. 5, that may include a standalone server or another type of computing device.

The vehicle database 450 may be implemented on a remote computing device that responds to queries from requesting devices over the Internet and/or another network (e.g., a cellular network, a PLMN, an LAN, a WAN, a private network, the Internet, and/or a combination of these or other types of networks). The vehicle database 450 may be implemented on or may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. As described herein, the vehicle database 450 may aggregate data from a plurality of sources (e.g., a plurality of vehicle dealers).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of a device 500 associated with a web browser plugin described herein. The device 500 may correspond to a user device described herein. In some implementations, the user device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
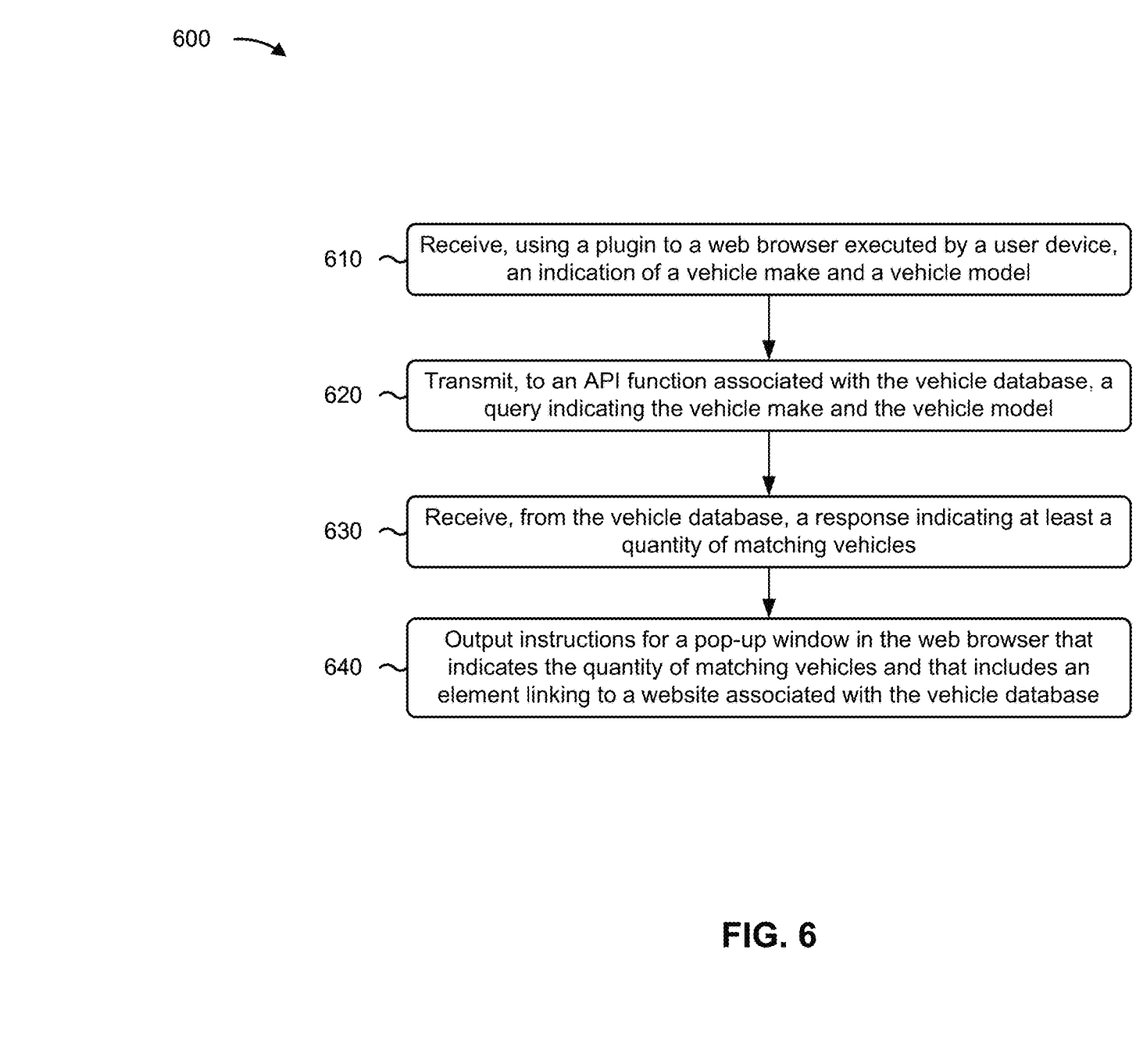
FIG. 6 is a flowchart of an example process relating to redirecting to a website for a vehicle database, in accordance with some embodiments of the present disclosure.

FIG. 6 is a flowchart of an example process 600 associated with redirecting to a website for a vehicle database. In some implementations, one or more process blocks of FIG. 6 may be performed by a user device described herein. In some implementations, one or more process blocks of FIG. 6 may be performed by another device or a group of devices separate from or including the user device, such as the website host 440 and/or a device implementing the vehicle database 450 Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, using a plugin to a web browser executed by a user device, an indication of a vehicle make and a vehicle model (block 610). For example, the user device (e.g., using processor 520, memory 530, input component 540, and/or communication component 560) may receive, using a plugin to a web browser executed by a user device, an indication of a vehicle make and a vehicle model, as described above in connection with reference numbers 130a and/or 130b of FIG. 1B. As an example, the plugin may determine the indication based on user input and/or may monitor elements of a webpage to determine the indication.

As further shown in FIG. 6, process 600 may include transmitting, to an API function associated with the vehicle database, a query indicating the vehicle make and the vehicle model (block 620). For example, the user device (e.g., using processor 520, memory 530, and/or communication component 560) may transmit, to an API function associated with the vehicle database, a query indicating the vehicle make and the vehicle model, as described above in connection with reference number 135 of FIG. 1C. As an example, the API function may be associated with an aggregator for a plurality of vehicle dealers, and the plugin may call the API function in the background.

As further shown in FIG. 6, process 600 may include receiving, from the vehicle database, a response indicating at least a quantity of matching vehicles (block 630). For example, the user device (e.g., using processor 520, memory 530, input component 540, and/or communication component 560) may receive, from the vehicle database, a response indicating at least a quantity of matching vehicles, as described above in connection with reference number 140 of FIG. 1C. As an example, the response may include an HTTP response and/or a return from the API function.

As further shown in FIG. 6, process 600 may include outputting instructions for a pop-up window in the web browser that indicates the quantity of matching vehicles and that includes an element linking to the website associated with the vehicle database (block 640). For example, the user device (e.g., using processor 520, memory 530, and/or output component 550) may output instructions for a pop-up window in the web browser that indicates the quantity of matching vehicles and that includes an element linking to the website associated with the vehicle database, as described above in connection with reference number 145 of FIG. 1D. As an example, the pop-up window may be as described in connection with FIG. 2 and/or FIG. 3. For example, the pop-up window may include text that indicates the quantity of matching vehicles and a button that links to a website associated with the vehicle database.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E, FIG. 2, and/or FIG. 3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for redirecting to a website associated with a vehicle database, the system comprising:
    one or more memories; and
    one or more processors, communicatively coupled to the one or more memories, configured to:
        receive, from a webpage unaffiliated with the vehicle database and using a plugin to a web browser executed by a user device, an indication of a vehicle make and a vehicle model,
        wherein the receiving is based on the webpage unaffiliated with the vehicle database satisfying one or more criteria; and
        wherein the webpage unaffiliated with the vehicle database functions as a front-end for a database associated with a vehicle dealer not participating in the vehicle database;
    transmit, to an application programming interface (API) function associated with the vehicle database, a query indicating the vehicle make and the vehicle model, wherein the API function is associated with an aggregator for a plurality of vehicle dealers, the plurality of vehicle dealers excluding the vehicle dealer not participating in the vehicle database;
    receive, from the vehicle database, a response indicating at least a quantity of matching vehicles; and
    output instructions for a pop-up window in the web browser that indicates the quantity of matching vehicles and that includes an element linking to the website associated with the vehicle database.

2. The system of claim 1, wherein the one or more processors are configured to:
    receive, using the plugin, an indication of a vehicle year, wherein the query further indicates the vehicle year.

3. The system of claim 1, wherein the one or more processors are configured to:
    determine that the webpage unaffiliated with the vehicle database satisfies one or more criteria,
        wherein the query is transmitted to the API function based on the webpage unaffiliated with the vehicle database satisfying the one or more criteria.

4. The system of claim 1, wherein the one or more processors, to receive the indication of the vehicle make and the vehicle model, are configured to:
    monitor user input into the webpage unaffiliated with the vehicle database; and
    determine the indication of the vehicle make and the vehicle model based on the user input.

5. The system of claim 1, wherein the one or more processors, to receive the indication of the vehicle make and the vehicle model, are configured to:
    monitor elements of the webpage unaffiliated with the vehicle database; and
    determine the indication of the vehicle make and the vehicle model based on the elements.

6. The system of claim 1, wherein the one or more processors are configured to:
    receive an indication of an interaction with the element; and
    output instructions, in response to the indication of the interaction, for the web browser to navigate to the website associated with the vehicle database.

7. The system of claim 1, wherein the instructions for the pop-up window further indicate a comparison amount associated with the webpage unaffiliated with the vehicle database.

8. The system of claim 1, wherein the pop-up window indicates one or more monthly financing prices associated with a company.

9. The system of claim 1, wherein the pop-up window indicates a comparison monthly amount that is associated with a national average.

10. A method of redirecting to a website associated with a vehicle database, comprising:

receiving, from a webpage unaffiliated with the vehicle database and using a plugin to a web browser executed by a user device, an indication of a vehicle make and a vehicle model,
   wherein the receiving is based on the webpage unaffiliated with the vehicle database satisfying one or more criteria; and
   wherein the webpage unaffiliated with the vehicle database functions as a front-end for a database associated with a vehicle dealer not participating in the vehicle database;
transmitting, to an application programming interface (API) function associated with the vehicle database, a query indicating the vehicle make and the vehicle model, wherein the API function is associated with an aggregator for a plurality of vehicle dealers, the plurality of vehicle dealers excluding the vehicle dealer not participating in the vehicle database;
receiving, from the vehicle database, a response indicating at least a quantity of matching vehicles;
outputting an indication of the quantity of matching vehicles;
receiving input from a user of the user device; and
outputting instructions, in response to the input from the user, for the web browser to navigate to the website associated with the vehicle database.

11. The method of claim 10, wherein the response further indicates at least one amount, and the method further comprises:
   outputting an indication of the at least one amount.

12. The method of claim 11, further comprising:
extracting, using the plugin, a comparison amount; and
outputting an indication of the comparison amount with the indication of the at least one amount.

13. The method of claim 10, further comprising:
detecting a location associated with the user device,
   wherein the query further indicates the location.

14. The method of claim 10, further comprising:
receiving, using the plugin, an indication of a vehicle trim,
   wherein the query further indicates the vehicle trim.

15. The method of claim 10, further comprising:
transmitting, to an API function associated with an affiliate of the vehicle database, a request for a monthly amount;
receiving, from the affiliate of the vehicle database, a response indicating the monthly amount; and
outputting an indication of the monthly amount.

16. A non-transitory computer-readable medium storing a set of instructions for redirecting to a website associated with a vehicle database, the set of instructions comprising:
one or more instructions that, when executed by one or more processors of a device, cause the device to:
   initiate a plugin based on execution of a web browser, associated with the plugin, by a user device;
   determine, using the plugin, that the web browser has loaded a webpage unaffiliated with the vehicle database;
   extract, from the webpage unaffiliated with the vehicle database and using the plugin, an indication of a vehicle make and a vehicle model based on user input into the webpage,
     wherein the extracting is based on the webpage unaffiliated with the vehicle database satisfying one or more criteria; and
     wherein the webpage unaffiliated with the vehicle database functions as a front-end for a database associated with a vehicle dealer not participating in the vehicle database;
   transmit, to an application programming interface (API) function associated with the vehicle database, a query indicating the vehicle make and the vehicle model, wherein the API function is associated with an aggregator for a plurality of vehicle dealers, the plurality of vehicle dealers excluding the vehicle dealer not participating in the vehicle database;
   receive, from the vehicle database, a response indicating at least a quantity of matching vehicles; and
   output an indication of the quantity of matching vehicles.

17. The non-transitory computer-readable medium of claim 16, wherein the one or more instructions, when executed by the one or more processors, cause the device to:
   receive a confirmation from a user of the user device,
     wherein the plugin is initiated in response to the confirmation.

18. The non-transitory computer-readable medium of claim 16, wherein the one or more instructions, that cause the device to determine that the web browser has loaded the webpage unaffiliated with the vehicle database, cause the device to:
   compare a uniform resource locator (URL) used by the web browser with a list of a URLs to determine that the web browser has loaded the webpage unaffiliated with the vehicle database.

19. The non-transitory computer-readable medium of claim 16, wherein the user input into the webpage comprises one or more of:
text input into a text box;
a selection from a drop-down menu or a set of radio buttons; or
a selection from a plurality of filters.

20. The non-transitory computer-readable medium of claim 16, wherein the one or more instructions, when executed by the one or more processors, cause the device to:
   receive, from a cache associated with the plugin, an endpoint associated with the API function.

\* \* \* \* \*